United States Patent

[11] 3,596,045

| [72] | Inventors | Karl-Heinz Steigerwald<br>Lochham;<br>Dieter Konig, Munich; Joachim Geissler, Vaterstetten, all of, Germany |
|---|---|---|
| [21] | Appl. No. | 536,617 |
| [22] | Filed | Mar. 23, 1966 |
| [45] | Patented | July 27, 1971 |
| [73] | Assignee | K. H. Steigerwald GmbH |
| [32] | Priority | Mar. 30, 1965 |
| [33] | | Germany |
| [31] | | St 23 592 |

[54] MACHINING PROCESS USING RADIANT ENERGY
6 Claims, No Drawings

[52] U.S. Cl. ................................... 219/121 EB,
219/121 L, 219/347
[51] Int. Cl. ..................................... B23k 15/00,
B23k 27/00
[50] Field of Search .......................... 219/121 L,
121 EB, 69 R, 68, 70, 347—349, 338

[56] References Cited
UNITED STATES PATENTS

| 2,622,053 | 12/1952 | Clowe et al. | 219/347 UX |
| 3,147,366 | 9/1964 | Dreyfoos | 219/338 X |
| 3,410,979 | 11/1968 | Larsson | 219/68 |
| 3,293,652 | 12/1966 | Roshon et al. | 219/121 L UX |

OTHER REFERENCES

Title page (p. 66) IEEE Spectrum July 1964, copy in Group 213, class 219-121 Laser (copies made in Group 213)

*Primary Examiner*—R. F. Staubly
*Attorney*—Sandoe, Hopgood and Calimafde

ABSTRACT: A process using a beam of radiant energy, such as electron beams and laser beams, for removing material from a workpiece wherein the workpiece is made of a material which has a low degree of energy absorption for the kind of radiant energy used consists in finely distributing an auxiliary material having a high beam absorbing characteristic within the workpiece material in at least the portion thereof from which material by absorbing heat builds up vapor pressure which carries the adjacent molten material out of the work zone.

MACHINING PROCESS USING RADIANT ENERGY

It is prior art to use radiation as a source of energy for thermal machining. This is a process during which high-energy radiation, for example accelerated electrons, is absorbed by the workpiece and a source of heat thus created directly in the working zone. By means of appropriate control devices, the surface power density of the impinging beam section can be chosen so that the desired thermal effect, e.g. preheating, melting or evaporating, is achieved with many different materials.

When machining materials of low absorptivity (in the case of electron beams, for instance plastics; in the case of laser beams, for instance, glasses), it has been found that due to the relatively great depth of penetration of the radiation in these materials even a high surface power density is not always sufficient to produce the volume power density required for the desired machining effect. In many cases, this will even made machining entirely impossible.

The present invention indicates a possibility of increasing the volume power density in or at the workpiece and thus influencing the machining effect in the desired manner. Some types of machining, particularly in the micromachining field, have thus become possible for the first time. The invention consists in that an increase of power concentration in the working zone is enforced by an appropriate permanent or temporary disposition of highly absorbent substances in or at materials of low absorptivity.

The favorable effect of higher power concentration on machining in which material is removed (in the course of which a melted zone is always produced at the edge of the evaporation zone, which in this case is undesirable), will then consist in that in the working zone a relatively high vapor pressure can build up due to the higher temperature, which causes the adjacent molten material to be flung away as by explosion. It can thus be prevented that, for example, a borehole or a profile opening just produced is once more closed by molten material after energy is cut off. Moreover, when the highly absorbent additive is included in the material proper, the increased volume power density will from the very start increase the amount of evaporating material in relation to the molten material.

If highly absorbent (e.g. pulverulent) substances are incorporated permanently, the incorporation of such centers of absorption is most effective if the concentration can be made as high as possible. Care must only be taken to avoid an adverse effect on certain properties of the basic material required for its ultimate use, such as, for example, electricity, plasticity, thermal conductivity, electric conductivity or insulating strength, etc.

As a first example of the effect of the present invention, mention may be made of the production of holes and profile openings in plastics with the aid of electron beams. In plastic films uniformly interspersed with metallic oxides small openings (of a few microns) can be produced with clean edges. Work of this type is not normally possible with pure plastic films, since excessive material is molten and remains in the working zone after the electron beam is cut off, so that the boreholes or profiles are partly or entirely filled up again. If energy is supplied over a longer period, large molten areas are caused, in the center of which relatively large openings remain; but these are bounded by unsuitable edges.

As a second example, the machining of aluminum sheets may be used to show the favorable effect of a material of higher power concentration applied from the outside in the form of a base plate. With the aid of electron beams, very clean, cylindrical holes and profiles of low wall roughness can be produced in aluminum sheets attached, for example, to a brass plate. This effect is due to the fact that the relatively high vapor pressure, which is produced when the electrons strike the brass, practically all molten aluminum is flung away from the working zone thus avoiding the undesirable effect of the molten material after disconnection of the power supply.

As a third example, the use of laser beams for working glass interspersed as uniformly as possible with fine pulverulent material may be mentioned. Here the effect of the invention is particularly striking, since only the addition of highly absorbent extraneous material makes it possible to transmit energy from the laser beam to the working zone. The aforementioned cases are merely examples illustrating the application of the invention, which is fully applicable to any desired combination of basic and additional materials.

What we claim is:

1. A process for performing work on a workpiece with a beam of charged particles, wherein the workpiece is made of a material which has a low degree of energy absorption for the beam, comprising finely distributing within at least a portion of said workpiece an auxiliary material having a high beam absorption characteristic and being selected to develop a high vapor pressure at the working temperature, and directing a beam of charged particles at such workpiece portion for creating a relatively high vapor pressure in the working zone within said portion of the workpiece and thereby performing material removing work on the working zone of the workpiece.

2. The process as recited in claim 1, wherein said beam of radiant energy is a beam of electrons.

3. A process for material removing machining a plastic workpiece material with a beam of charged particles to form micro-sized openings therein, comprising distributing throughout the plastic workpiece finely divided beam absorbing auxiliary material to impart a higher beam absorption characteristic to the plastic workpiece, and directing a beam of charged particles at the plastic workpiece for performing material removing work thereon.

4. The process as recited in claim 3 wherein the distributing step comprises distributing metallic oxide power throughout the plastic workpiece.

5. The process as recited in claim 3 wherein the auxiliary material is distributed in the plastic workpiece in the form of a fine metallic powder.

6. The process as recited in claim 3 in which the auxiliary material is uniformly distributed throughout the plastic workpiece.